United States Patent
Grass et al.

(10) Patent No.: US 8,202,959 B2
(45) Date of Patent: Jun. 19, 2012

(54) PROCESS FOR PREPARING POLYMERS FROM 3-METHYLBUT-1-ENE

(75) Inventors: Michael Grass, Haltern am See (DE); Franz Nierlich, Marl (DE); Walter Kaminsky, Pinneberg (DE); Stefanie Derlin, Reinbek (DE); Klaus-Diether Wiese, Haltern am See (DE); Dagmara Ortmann, Wohlen (CH)

(73) Assignee: Evonik Oxeno GmbH, Marl (DE)

( * ) Notice: Subject to any disclaimer, the term of this patent is extended or adjusted under 35 U.S.C. 154(b) by 0 days.

(21) Appl. No.: 13/095,541

(22) Filed: Apr. 27, 2011

(65) Prior Publication Data

US 2011/0201767 A1  Aug. 18, 2011

Related U.S. Application Data

(62) Division of application No. 12/307,600, filed as application No. PCT/EP2007/054580 on May 11, 2007.

(30) Foreign Application Priority Data

Jul. 11, 2006 (DE) .......................... 10 2006 031 960

(51) Int. Cl.
*C08F 4/642* (2006.01)
*C08F 4/6592* (2006.01)
*C08F 210/14* (2006.01)

(52) U.S. Cl. ..................... 526/348.6; 526/160; 526/165; 526/943

(58) Field of Classification Search .................. 526/160, 526/165, 348.6, 943
See application file for complete search history.

(56) References Cited

U.S. PATENT DOCUMENTS

| 3,661,878 | A | 5/1972 | Aishima et al. |
| 3,787,323 | A | 1/1974 | Aishima et al. |
| 7,402,638 | B2 * | 7/2008 | Matsumura et al. .......... 526/129 |
| 2002/0091217 | A1 | 7/2002 | Oi et al. |
| 2003/0105252 | A1 | 6/2003 | Reb et al. |
| 2007/0135665 | A1 | 6/2007 | Wiese et al. |

FOREIGN PATENT DOCUMENTS

| DE | 31 46 568 | 7/1982 |
| EP | 1 197 501 | 4/2002 |
| JP | 8 73675 | 3/1996 |
| WO | 2005 080302 | 9/2005 |

OTHER PUBLICATIONS

Beulich, I., "Copolymerisation Von Ethen Und Sterisch Anspruchsvollen Olefinen Durch Metallocen-Katalysatoren", Dissertation, pp. 4-242 (1999) XP008081647.
Kaminsky, W. et al., "Copolymerization of Ethene With Cyclic and Other Sterically Hindered Olefins", Macromolecular Symposia, No. 173, pp. 211-225 (2001) XP001104625.
Heuer, B., "Alternierende Copolymerisation Von Ethen Und Propen Mit $C_1$-Symmetrischen Metallocen/ MAO-Katalysatoren", Dissertation, pp. 1-200 (2004) XP008081648.
Heuer, B. et al., "Alternating Ethene/Propene Copolymers by $C_1$-Symmetrischen Metallocen/ MAO Catalysts", Macromolecules, vol. 38, No. 8, pp. 3054-3059 (2005) XP001227418.

* cited by examiner

*Primary Examiner* — Caixia Lu
(74) *Attorney, Agent, or Firm* — Oblon, Spivak, McClelland, Maier & Neustadt, L.L.P.

(57) ABSTRACT

The present invention relates to a copolymer which contains 3-methylbut-1-ene as a comonomer and which contains ethene or propene as a further monomer, the proportion of the incorporated 3-methylbut-1-ene being 0.1 to 40 mol %, and to a process for preparing such copolymers, the polymerization being performed in the presence of a catalyst which comprises at least one cyclopentadienyl group.

20 Claims, 2 Drawing Sheets

PROCESS FOR PREPARING POLYMERS FROM 3-METHYLBUT-1-ENE

CROSS REFERENCE TO RELATED APPLICATIONS

Figure 1:
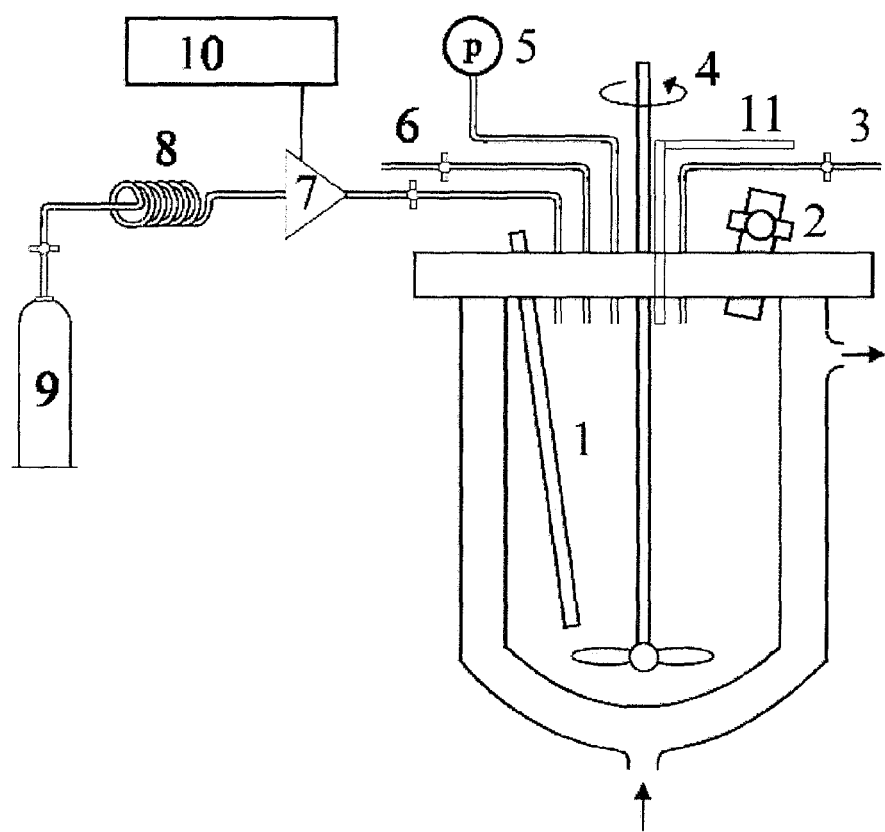

The present application is a divisional application of U.S. application Ser. No. 12/307,600, which the national stage of international application PCT/EP2007/054580, filed on May 11, 2007, the text of which is incorporated by reference, and claims the benefit of the filing date of German Application No. 10 2006 031 960.5, filed on Jul. 11, 2006, the text of which is also incorporated by reference.

The present invention relates to the preparation of polymers using 3-methylbut-1-ene as a comonomer.

3-Methylbut-1-ene is a frequently used monomer which is used to prepare copolymers and block copolymers, especially those of ethene or propene. Such copolymers or block copolymers can be used, for example, to produce films or fibers.

JP 08-073675 describes the preparation of a propene polymer composition (polymer blend) which has a high melting point and which is obtained by polymerizing 3-methylbut-1-ene over a titanium catalyst and subsequently polymerizing propene.

DE 31 46 568 describes the preparation of polyethylene which may comprise up to 0.2% by mass of 3-methylbut-1-ene. The catalyst used is a chromium-titanium catalyst. U.S. Pat. No. 3,661,878 describes the preparation of ethene polymers which comprise up to 10% 3-methylbut-1-ene. The catalyst used is a catalyst composed of dimethylhydrosiloxy-dimethylaluminum and titanium tetrachloride. In U.S. Pat. No. 3,787,323, a titanium catalyst is likewise used to prepare polyethylene which comprises up to 10% 3-methylbut-1-ene.

Polymerization using heterogeneous titanium catalysts is relatively complex. It is therefore an object of the present invention to provide an alternative catalyst system which is suitable for preparing polymers or copolymers of 3-methylbut-1-ene.

In recent times, the polymerization catalysts have frequently been those which have cyclopentadienyl groups. The best-known catalysts of this type are metallocene catalysts which have two cyclopentadienyl groups.

DE 100 52 162 describes the use of metallocene catalysts for the polymerization of olefins. The monomers used may also include ethene or 3-methylbut-1-ene. US 2003/0092925 describes the use of particular metallocene catalysts in the polymerization of olefins. U.S. Pat. No. 6,531,554 describes the preparation of metallocene catalysts and their use for the polymerization of alpha-olefins. WO 2005/070977 describes a catalyst composition which comprises a plurality of metallocene compounds. The catalyst composition can be used to prepare homo- and copolymers.

U.S. Pat. No. 5,703,187 (The Dow Chemical Company) describes a process for preparing copolymers from an olefin and a sterically hindered vinylidenic monomer in which a metal complex catalyst which has a substituted or unsubstituted cyclopentadienyl group is used. In U.S. Pat. No. 6,072,014, modified catalysts of the same type are used for polymerization. The monomers used may, for example, be ethene or 3-methylbut-1-ene. US 2003/0105252 describes the polymerization of alpha-olefins, in which a metal complex catalyst which has a cyclopentadienyl group is likewise used. US 2004/0186253 describes the preparation of homopolymers, copolymers or block copolymers, the catalyst used being a metallocene precursor which has only one cyclopentadienyl group.

None of the aforementioned documents explicitly describes the preparation of polymers comprising 3-methylbut-1-ene.

The thesis "Copolymerisation von Ethen and sterisch anspruchsvollen Olefinen durch Metallocen-Katalysatoren" [Copolymerization of ethene and sterically demanding olefins by means of metallocene catalysts], Inken Beulich, University of Hamburg 1999, describes the copolymerization of ethene with a wide variety of different olefins. One copolymerization described is that of ethene with 3-methylbut-1-ene. The catalysts described for the copolymerization of ethene with 3-methylbut-1-ene are the compounds [Me$_2$C(3-MeCp)(Flu)]ZrCl$_2$ and [Me$_2$Si(Ind)(Flu)]ZrCl$_2$. Further suitable catalysts or else process parameters were not specified.

It is therefore an object of the present invention to provide alternative processes for preparing copolymers comprising 3-methylbut-1-ene.

It has now been found that, surprisingly, a catalyst which has at least one cyclopentadienyl group can afford polymers of ethene and/or propene which comprise 0.1 to 40 mol % of 3-methylbut-1-ene.

The present invention therefore provides a process for preparing copolymers based on ethene and/or propene as a monomer and 3-methylbut-1-ene as a comonomer, the proportion of the 3-methylbut-1-ene in the copolymer being 0.1 to 40 mol %, which is characterized in that the copolymerization is performed in the presence of a catalyst of the formula (Cp*)(Y)M(X)$_m$

where Cp*=group of the cyclopentadienyl type, selected from substituted and unsubstituted cyclopentadienyl, indenyl, tetrahydroindenyl, octahydrofluorenyl and fluorenyl groups, Y=group of the cyclopentadienyl type, selected from substituted and unsubstituted cyclopentadienyl, indenyl, tetrahydroindenyl, octahydrofluorenyl and fluorenyl groups, or anionic ligand group containing nitrogen, phosphorus, oxygen or sulfur and up to 20 atoms which are not hydrogen, where Cp* and Y may be joined to one another covalently or via a Z group, X=in each case independently a halogen atom, a pseudohalogen, a hydrogen atom, a silyl group, a phosphide, a sulfide or an organic radical and m=a number which is sufficient to saturate the valences of M with the X, and an aluminum- or boron-comprising compound as a cocatalyst, with the proviso that, when the process is a process for preparing copolymers based on ethene as a monomer and 3-methylbut-1-ene and is performed in particular at a temperature of 30° C., the compound of the formula I used is not [Me$_2$C(3-MeCp)(Flu)]ZrCl$_2$ or [Me$_2$Si(Ind)(Flu)]ZrCl$_2$.

The present invention likewise provides a copolymer which contains 3-methylbut-1-ene as a comonomer, which is characterized in that ethene or propene is present as a further monomer, the proportion of the incorporated 3-methylbut-1-ene is 0.1 to 40 mol % and the copolymer has a melting point of below room temperature to 130° C., preferably of room temperature to 130° C., and which is obtainable in particular by the process according to the invention.

The process according to the invention has the advantage that it is possible in a simple manner to prepare copolymers of 3-methylbut-1-ene with ethene or propene. Depending on the process conditions, copolymers can be obtained which have melting points which range from the melting point of the homopolymer of ethene or propene to below room temperature, or else those which do not have a melting point but rather a glass transition temperature. The molar mass of the copolymers is adjustable over a wide range.

By virtue of the fact that wide ranges of the molar masses of the copolymers can be set in the case of use of 3-methylbut-1-ene as a comonomer, the 3-methylbut-1-ene can be used as a comonomer for the preparation of copolymers with different properties, for which different comonomers are typically used. As a result of the use of 3-methylbut-1-ene as a comonomer, only one comonomer needs to be stored instead of the multitude of comonomers customary to date.

In comparison with 1-butene as a comonomer, in the case of use of 3-methylbut-1-ene, even half (in molar terms) of incorporation of the comonomer is sufficient to achieve the lowering of the melting point desired for the preparation of LLDPE (desired melting point of LLDPE approx. 105 to 115° C.). Even in comparison with 1-octene in the copolymer, smaller molar incorporation rates are sufficient in the case of use of 3-methylbut-1-ene to achieve the desired lowering of the melting point.

The process according to the invention, in which 3-methylbut-1-ene is used as a comonomer, also makes it possible to obtain copolymers which have a narrow molar mass distribution compared to conventional copolymers which are prepared with Ziegler-Natta catalysts.

The incorporation of 3-methylbut-1-ene additionally allows a higher strength of the resulting copolymers to be achieved.

The process according to the invention and the products prepared with it will be described by way of example hereinafter without any intention that the invention be restricted to these exemplary embodiments. When ranges, general formulae or compound classes are specified hereinafter, these shall encompass not only the corresponding ranges or groups of compounds which are mentioned explicitly but also all sub-ranges and sub-groups of compounds which can be obtained by taking out individual values (ranges) or compounds.

In the process according to the invention for preparing copolymers based on ethane and/or propene as a monomer and 3-methylbut-1-ene as a comonomer, the proportion of the 3-methylbut-1-ene in the copolymer being 0.1 to 40 mol %, preferably 0.1 to 36 mol %, the copolymerization is performed in the presence of a catalyst of the formula $(Cp^*)(Y)M(X)_m$

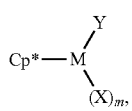

where $Cp^*$=group of the cyclopentadienyl type, selected from substituted and unsubstituted cyclopentadienyl, indenyl, tetrahydroindenyl, octahydrofluorenyl and fluorenyl groups,
Y=group of the cyclopentadienyl type, selected from substituted and unsubstituted cyclopentadienyl, indenyl, tetrahydroindenyl, octahydrofluorenyl and fluorenyl groups, or anionic ligand group containing nitrogen, phosphorus, oxygen or sulfur and up to 20 atoms which are not hydrogen, where $Cp^*$ and Y may be joined to one another covalently or via a Z group, M=metal of group 3 to 10, with the exception of scandium, preferably of group 4 to 6, or of the lanthanoids, of the Periodic Table of the Elements, X=in each case independently a halogen atom, a pseudohalogen, for example a cyanide or azide, a hydrogen atom, a silyl group, a phosphide, a sulfide or an organic radical, for example an alkyl, aryl, amide, aryloxy, alkoxy, acetyl or acetylacetonate radical, in particular an organic radical which has 1 to 20 carbon atoms, and m=a number which is sufficient to saturate the valences of M with the X, and an aluminum- or boron-comprising compound as a cocatalyst, with the proviso that, when the process is a process for preparing copolymers based on ethene as a monomer and 3-methylbut-1-ene and is performed in particular at a temperature of 30° C., the compound of the formula I used is not $[Me_2C(3-MeCp)(Flu)]ZrCl_2$ or $[Me_2Si(Ind)(Flu)]ZrCl_2$. When more than one X is present in the catalyst of the formula I, the X groups present are preferably the same. As the metal M, the inventive catalyst preferably comprises Zr, Ti or Hf. Possible substituents on the cyclopentadienyl, indenyl, tetrahydroindenyl, octahydrofluorenyl and fluorenyl groups may in particular be alkyl, aryl, alkylaryl, aralkyl or silyl radicals. Preferred substituents are alkyl radicals, for example methyl, ethyl, propyl or tert-butyl radicals.

Preference is given to performing the copolymerization in the presence of a catalyst of the formula $Z(Cp^*)(Y)M(X)_m$ (compound Ia)

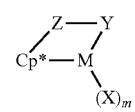

in which $Cp^*$, Y, M, X and m are each as defined in formula I and Z=boron or a group which comprises an element of group 14 of the Periodic Table of the Elements and has up to 20 atoms which are not hydrogen atoms. Preference is given to using a catalyst in which Z is a $CR^2R^3$ group or an $SiR^2R^3$ group where $R^2$ and $R^3$ are the same or different and are each hydrogen or an aromatic, aliphatic-aromatic, aromatic-aliphatic or aliphatic radical. Suitable aromatic radicals are also heteroaromatic radicals. The aliphatic radicals present may be linear, branched or cyclic aliphatic radicals. The $R^2$ and $R^3$ radicals are more preferably $C_1$- to $C_6$-alkyl radicals, especially methyl or ethyl or phenyl radicals.

In the copolymerization, preference is given to using only a single compound of the formula I or, if appropriate, a racemic mixture thereof as the catalyst.

In the process according to the invention, preference is given to not using those compounds of the formula I which have an amidine group or a derivative of the amidine group, especially those as described, for example, in US 2004/0186253, or which have an aryl radical attached via a chain having 1 to 3 carbon and/or silicon atoms with a cyclopentadienyl group, as described in particular in U.S. Pat. No. 6,531,554, or which have an indenyl group substituted by an alkenyl group, preferably exactly one alkenyl group, preferably an alkenyl group having 5 to 6 carbon atoms, and a dimethylsilane-tert-butylamido group, as described in particular in US 2003/0105252, or which have two cyclopentadienyl groups which are attached via a bridge composed of a carbon atom to which are also bonded a terminally unsaturated hydrocarbon radical and an aryl radical, as described in particular in US 2003/0092925, or which have more than one metal atom, as described in particular in U.S. Pat. No. 6,072,014, or which are [Me$_2$C(3-MeCp)(Flu)]ZrCl$_2$ or [Me$_2$Si(Ind)(Flu)]ZrCl$_2$, as described in the thesis "Copolymerisation von Ethen und sterisch anspruchsvollen Olefinen durch Metallocen-Katalysatoren", Inken Beulich, University of Hamburg 1999, pages 188 to 204, or in "W. Kaminsky, I. Beulich; Copolymerization of Ethene with Cyclic and Other Sterically Hindered Olefins", Macromol. Symp. 173, 211-225 (2001)". Reference is made explicitly to the documents mentioned and to their contents.

The aluminum-comprising compounds used may, for example, be organoaluminum compounds. The boron-comprising compounds used may, for example, be borates. The organic aluminum compounds used are preferably alkylaluminoxanes, aluminum alkyls or aluminum alkyl halides. The organoaluminum compound used is more preferably methylaluminoxane (MAO). The preparation of aluminoxanes can be taken, for example, from U.S. Pat. No. 5,099,050, WO 2005/070977, US 2003/0092925 or U.S. Pat. No. 5,041,583, or be effected analogously to U.S. Pat. No. 4,542,119, whose contents shall be included in the disclosure content of the present invention. The preparation of suitable aluminum alkyl compounds can be taken, for example, from U.S. Pat. No. 5,703,187, whose contents shall likewise be included in the disclosure content of the present invention. The document U.S. Pat. No. 5,703,187 also discloses preferred catalysts of the formula I and their preparation. The document "Copolymerisation von Ethen und sterisch anspruchsvollen Olefinen durch Metallocen-Katalysatoren", Inken Beulich, University of Hamburg 1999, likewise discloses catalysts of the formula I. This document, in particular, also discloses suitable preparation processes for catalysts and cocatalysts, and also test methods for analyzing the copolymers. The contents of this document shall also be included in the disclosure content of the present invention.

The catalyst of the formula I can be obtained, for example, by reacting a metal compound MX$_{m+2}$ where M and X are each as defined in formula I and the number of X is sufficiently large that the compound MX$_{m+2}$ is electrically neutral with a compound which has a dianion of the formula (Cp*-Z—Y)$^{2-}$, or successively (sequence as desired) with compounds which have a Cp* anion and a Y anion.

The reaction is effected preferably in a solvent. The solvents used may be all solvents or solvent mixtures which are inert in relation to the reaction. Preference is given to effecting the reaction in a solvent which can also be used in the polymerization. Particular preference is given to effecting the reaction to obtain the catalyst of the formula I in toluene, ethylbenzene, butane or xylene or mixtures thereof.

The reaction to obtain a catalyst of the formula I is effected preferably in an inert gas atmosphere. Suitable inert gases are, for example, nitrogen or argon. Preference is given to effecting the reaction at a temperature of −90 to 150° C., preferably at −20 to 70° C.

Compounds which may have a dianion of the formula (Cp*-Z—Y)$^{2-}$ or an anion Cp* or Y may be, for example, the corresponding alkali metal or alkaline earth metal compounds (salts). Preference is given to using salts of the formula Na$_2$(Cp*-Z—Y), K$_2$(Cp*-Z—Y), Li$_2$(Cp*-Z—Y), Mg(Cp*-Z—Y) or Ca(Cp*-Z—Y) as the compounds which have a dianion of the formula (Cp*-Z—Y)$^{2-}$. The compounds which have an anion Cp* or Y may, for example, be compounds of the formulae NaCp*, NaY, KCp*, KY, LiCp* or LiY. Reaction of these compounds with a compound MX$_{m+2}$ affords the corresponding salt cationX or cationX$_2$ and the catalyst of the formula I. The salts cationX or cationX$_2$ may be removed before the further use of the catalyst. If the salts precipitate out as solids, the removal can be effected, for example, by filtration.

The catalyst of the formula I can be prepared specially as described above in a preliminary step, or else be prepared directly and if appropriate in situ in the reaction vessel in which the polymerization is performed.

In the process according to the invention, the polymerization is performed preferably at a molar ratio of metal M of the catalyst of the formula I to aluminum of the cocatalyst of 1:0.1 to 1:100 000, preferably of 1:1 to 10:50 000 and more preferably of 1:100 to 1:25 000 and most preferably of 1:1000 to 1:10 000.

Cocatalyst and catalyst of the formula I can be fed to the polymerization vessel together or separately. Preference is given to adding them separately. Particular preference is given to not performing any prepolymerization.

The copolymerization is performed in the process according to the invention preferably at a molar ratio of monomers (unused) to catalyst of the formula I of 1×10$^{10}$:1 to 100:1, preferably of 1×10$^8$:1 to 500:1 and more preferably of 1×10$^6$:1 to 1000:1.

In the process according to the invention, the copolymerization can be performed in the liquid phase or in the gas phase. Preference is given to effecting the copolymerization in the liquid phase, since higher activities are achieved and a more uniform polymer is obtained. In addition, a carrier is required in the gas phase in the copolymerization, which possibly has to be removed again.

It may be advantageous when the copolymerization is performed in the presence of a solvent. The solvents used may be all liquids which behave inertly in the copolymerization. In the process according to the invention, preference is given to performing the copolymerization in an organic solvent selected from aliphatic hydrocarbons, for example hexane, heptane, decane, butane or cyclohexane, from aromatic hydrocarbons, for example benzene, or from hydrocarbons which have both aromatic and aliphatic constituents, for example toluene, xylene or ethylbenzene. It may be advantageous when solvents which are suitable for dissolving the catalyst of the formula I are used. Such solvents may be, in particular, for example, benzene, toluene, o-, m-, p-xylene, ethylbenzene, butylbenzene, mesitylene, hexane and heptane and naphthalene. In the process according to the invention, particular preference is given to using a solvent selected from toluene, xylene, hexane, butane and heptane.

In the process according to the invention, the copolymerization may be performed within a wide temperature range. Preference is given to performing the copolymerization at a temperature of −30° C. to 250° C., preferably at a temperature of 10 to 120° C. and more preferably at a temperature of 35 to 80° C., in particular of 50 to 75° C. Especially within the latter two temperature ranges, the copolymerization can be performed with a particularly high catalyst activity and hence very economically.

The copolymerization can be performed in the process according to the invention at reduced pressure, standard pressure or at elevated pressure. Preference is given to performing the copolymerization at a pressure of 0.1 to 10 MPa, preferably at a pressure of 0.1 to 1 MPa.

In the process according to the invention, the molar proportion of 3-methylbut-1-ene monomer in the reaction mixture of the copolymerization in the sum of the monomers of 3-methylbut-1-ene and ethene and propene is at least 20%.

The molar proportion of 3-methylbut-1-ene in the monomers in the mixture is preferably 40 to 80%.

In a preferred embodiment of the process according to the invention, the catalyst of the formula I used is a catalyst in which Cp* and Y are the same or different and are each a group selected from substituted or unsubstituted cyclopentadienyl group, indenyl group and fluorenyl group, where the substituents may in particular be alkyl groups, Z is a hydrocarbon group, preferably a $CR^2R^3$ or $SiR^2R^3$ where $R^2$ and $R^3$ are the same or different and are each H or a hydrocarbon radical having 1 to 20 carbon atoms, preferably 1 to 4 carbon atoms, M is a metal of group 4 to 6, especially of group 4, of the Periodic Table of the Elements, preferably Ti or Zr, X is a halogen, preferably Cl or F, and m=2, 3 or 4, especially 2. The catalyst of the formula I used is most preferably a catalyst of the formulae II or III

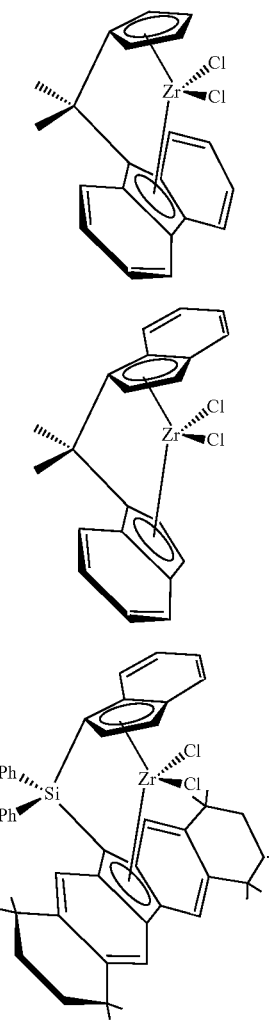

II

III

V

This embodiment of the process according to the invention is preferred especially when propene and 3-methylbut-1-ene are to be copolymerized. The catalysts of the formula III and V may preferably also be used for the copolymerization of ethene and 3-methylbut-1-ene. For instance, use of a catalyst of the formula III in the copolymerization with ethene allows particularly high incorporation rates to be achieved. Particular preference is therefore given to using catalysts of the formula I, especially of the formula Ia, in which Y and Cp* are identical, as is the case, for example, in the compound of the formula III.

A catalyst of the formula II can be prepared, for example, as described in EP 0 351 391. A catalyst of the formula III can be prepared, for example, as described by Spaleck et al. in New. J. Chem., 14, 6 (1990) 499. The compound III can also be obtained as follows: bis(2-indenyl)-propane is suspended in diethyl ether and deprotonated at −79° C. with n-Bu-Li in hexane. The reaction mixture is stirred at room temperature for 3 hours. Solid $ZrCl_4$ is added and the mixture is stirred again at room temperature overnight. The resulting suspension is added to Celite and extracted with fluorobenzene. The fluorobenzene is subsequently condensed out under reduced pressure. The resulting residue (compound III) is washed repeatedly with diethyl ether and recrystallized from fluorobenzene/diethyl ether.

A particularly preferred catalyst of the formula I is a catalyst of the formula VI, which can be used in the copolymerization of 3-methylbut-1-ene with ethene or propene. A specific embodiment of this catalyst has already been described above under formula V. The present invention therefore also provides a catalyst of the formula VI

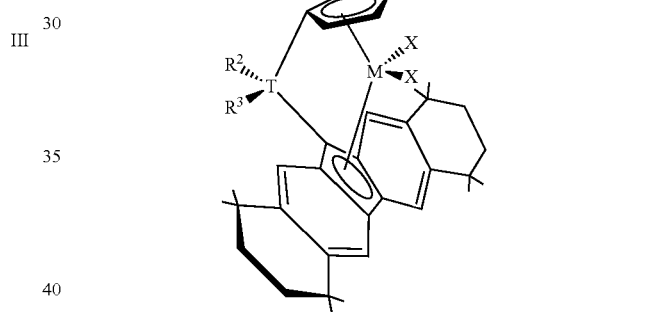

VI where T=C or Si, $R^2$ and $R^3$ are the same or different and are each H, hydrocarbon radical having 1 to 20 carbon atoms, preferably methyl, ethyl or phenyl radical, X=each independently a halogen atom, a pseudohalogen, for example a cyanide or azide, a hydrogen atom, a silyl group, a phosphide, a sulfide or an organic radical, for example an alkyl, aryl, amide, aryloxy, alkoxy, acetyl or acetylacetonate radical, especially an organic radical of 1 to 20 carbon atoms, preferably Cl, and M=metal of group 3 to 10, with the exception of scandium, preferably of group 4 to 6, preferably Zr, Ti or Hf, or of the lanthanoids, of the Periodic Table of the Elements. The inventive catalysts of the formula VI are preferably those which do not correspond to the formula V.

The catalyst of the formula VI can be obtained, for example, by, as described in the thesis "Altemierende Copolymerisation von Ethen and Propen mit C1-symmetrischen Metallocen/MAO-Katalysatoren" [Alternating copolymerization of ethene and propene with C1-symmetric metallocene/MAO catalysts], B. Heuer, Kaminsky Group, University of Hamburg 2004 using the example of a catalyst of the formula V, first preparing 1,1,4,4,7,7,10,10-octamethyl-1,2,3,4,7,8,9,10-octahydro-bibenzofluorene (OMOHBBF). This can be obtained by initially charging 100 g of 2,5-dichloro-2,5-dimethylhexane (0.546 mol; C8H16Cl2; M=183.12 g/mol) and 45.3 g of fluorene (0.273 mol; C13H10;

M=166.22 g/mol) in 800 ml of nitromethane, and slowly adding dropwise a solution of 44.6 g of aluminum chloride (0.334 mol; AlCl3; M=133.34 g/mol) in 60 ml of nitromethane. After about one third of the aluminum chloride addition, the mixture changes color from red/brown to blue/green with gentle heating and gas evolution. After approx. 10 minutes, the gas evolution abates and the rest of the aluminum chloride solution is added. The mixture is stirred overnight and subsequently has a dark violet color. After filtration, the violet filter residue is slurried in 400 ml of water, in the course of which the color disappears. 400 ml of n-hexane are added and the mixture is stirred overnight. The remaining precipitate is separated and combined with the organic phase, and the solvent is removed. The residue is admixed with 300 ml of hot n-hexane, filtered and washed with n-hexane until the filtrate remains colorless. The colorless product is dried in an oil-pump vacuum.

Subsequently, chlorodiphenyl-9-(1,1,4,4,7,7,10,10-octamethyl-1,2,3,4,7,8,9,10-octahydro-dibenzofluorenyl)silane (CDOODBFS) is prepared by suspending 11.6 g of (1,1,4,4,7,7,10,10-octamethyl-1,2,3,4,7,8,9,10-octahydrodibenzofluorenyl)lithium (30 mmol; C29H37Li; M=392.56 g/mol) in 150 ml of n-pentane, and slowly adding it via a cannula to a solution of 9.6 ml of dichlorodiphenylsilane (45 mmol; C12H10SiCl2; M=253.21 g/mol; d=1.20 g/cm$^3$) in 150 ml of n-pentane, and stirring the mixture overnight. The solvent is subsequently removed, and the residue is taken up in 130 ml of diethyl ether and filtered through Celite. Subsequently, the solvent is concentrated to about 30 ml and 30 ml of n-hexane are added. The mixture is concentrated further and, at approx. −20° C., the product crystallizes to colorless crystals.

In turn, subsequently, diphenyl-1-indenyl-9-(1,1,4,4,7,7,10,10-octamethyl-1,2,3,4,7,8,9,10-octahydrodibenzofluorenyl)silane is prepared by dissolving 4.09 g of chlorodiphenyl-9-(1,1,4,4,7,7,10,10-octamethyl-1,2,3,4,7,8,9,10-octahydrodibenzofluorenyl)silane (6.78 mmol; C41H47SiCl; M=603.37 g/mol) in 100 ml of diethyl ether, and admixing it with 828 mg of indenyllithium (6.78 mmol; C9H7Li; M=122.10 g/mol). The mixture is heated under reflux for ten days and then hydrolyzed with 100 ml of water. The organic phase is removed, the aqueous phase is extracted three times with diethyl ether, and the collected ethereal phases are dried over sodium sulfate. The product precipitates out of a solution of n-hexane with traces of diethyl ether as a white solid.

Diphenylsilyl-(1-indenyl-9-(1,1,4,4,7,7,10,10-octamethyl-1,2,3,4,7,8,9,10-octahydrodibenzo-fluorenyl))zirconium dichloride, as a catalyst of the formula VI, can then be obtained by dissolving 1.0 g of diphenyl-1-indenyl-9-(1,1,4,4,7,7,10,10-octamethyl-1,2,3,4,7,8,9,10-octahydrodibenzofluorenyl)silane (1.46 mmol; C50H54Si; M=683.07 g/mol) in 40 ml of diethyl ether, admixing it with 2 equivalents of n-butyllithium (2.93 mmol; C4H9Li; M=64.06 g/mol), and stirring the mixture overnight. 341 mg of zirconium tetrachloride (1.46 mmol, ZrCl4; M=233.04 g/mol) are added to the orange solution which is stirred again overnight. The solvent is removed from the intense red solution with fine white precipitate, and the residue is dissolved in 50 ml of dichloromethane and filtered through Celite. Subsequently, the solvent is removed again, and the residue is dissolved in 10 ml of diethyl ether and admixed with 10 ml of n-hexane. The solvent is removed from the mixture until a red precipitate occurs. Subsequently, the product is filtered off to obtain a catalyst of the formula VI.

In a further preferred embodiment of the process according to the invention, the catalyst of the formula I used is a catalyst in which Cp* is a cyclopentadienyl group substituted by 1 to 4, preferably 4, methyl groups, Y=a nitrogen- or phosphorus-comprising group, preferably an N—R$^1$ where R$^1$=hydrocarbon radical having 1 to 20 carbon atoms, Z is a silicon-comprising group M is a metal of group 4 to 6, especially group 4, of the Periodic Table of the Elements, preferably Ti or Zr, X is a halogen, preferably Cl or F, and m=2, 3 or 4, especially 2. The catalyst of the formula I used is most preferably a catalyst of the formula IV

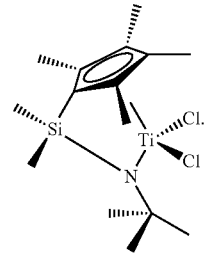

IV

This embodiment of the process according to the invention is preferred especially when ethene and 3-methylbut-1-ene are to be copolymerized. The catalyst of the formula IV can be prepared, for example, as described by J. Okuda in Chem. Ber. 1990, 123, 1649, or as described by F. Amor and J. Okuda in J. Organomet. Chem. 1996, 520, 245, or as described in EP 0 416 815 or U.S. Pat. No. 5,026,798.

The copolymerization is effected preferably for a time of 15 minutes to 4 hours, preferably 0.5 to 2 hours. The copolymerization can be terminated in a simple manner by interrupting the monomer feed or by adding an alcohol, for example ethanol. Preference is given to terminating the copolymerization by adding an alcohol, since the termination by interruption of the monomer feed can result in further copolymerization under non-constant conditions, since the copolymerization proceeds for as long as monomer is still available. The duration of the copolymerization can be adjusted, for example, by varying the amount of the catalyst used. The copolymerization can be performed batchwise or continuously.

The copolymerization mixture obtained in the copolymerization can be worked up in a known manner. Preference is given to effecting the workup in such a way that an agent with which the catalyst is destroyed is added to the copolymerization mixture. A suitable agent may, for example, be an alcohol, especially ethanol. Preference is given to adding sufficient agents to the copolymerization mixture that the agent is added in a molar excess, preferably in an at least 2- to 20-fold molar excess, in relation to the metal M of the catalyst of the formula I.

It may be advantageous when, in the workup of the copolymerization mixture, the mixture is treated with an acid, preferably with a 5 to 20% by mass solution of an acid, especially hydrochloric acid, in water or a water-ethanol mixture. In this way, catalyst residues can be removed from the copolymerization mixture. Subsequently, a sufficient amount of an agent suitable for neutralizing the copolymerization mixture, preferably sodium hydrogencarbonate, more preferably 1 to 50% by mass, preferably 5 to 10% by mass, sodium hydrogencarbonate solution (in water or a water-ethanol mixture) is preferably added to the copolymerization mixture such that the copolymerization mixture is neutral, i.e. preferably has a pH of approx. 7. The mixture thus obtained is preferably washed with water, preferably with demineralized water. Such a wash can be performed in a suitable apparatus, for example in an extraction column or a separating funnel.

Copolymers which are present in solid form in the copolymerization mixture can be removed from the copolymerization mixture treated in this way mechanically, for example by filtration or decantation. For the removal of soluble copolymers, the copolymerization mixture can be concentrated to such an extent that the copolymers precipitate out as a solid. This can be done in particular by thermal means. Copolymer which precipitates out in the course of concentration can in turn be removed mechanically from the copolymerization mixture.

It may be advantageous when the copolymers thus obtained are subjected to a drying process. In this way, it can be prevented that possibly health-endangering solvents which have possibly been used in the copolymerization process are released in an uncontrolled manner to the environment in the processing of the copolymers. The drying can be effected in apparatus suitable for this purpose, for example in a drying cabinet in the laboratory. Preference is given to effecting the drying at a temperature of 30 to 60° C.

In the process according to the invention, it is possible to use 3-methylbut-1-ene, ethene and/or propene which may have been obtained in any conceivable way. Depending on whether the monomers are present as pure substances or in a mixture with other components, it may be necessary or advantageous to treat such a mixture chemically or physically. Such a treatment is necessary especially when the mixture comprises components which slow the copolymerization reaction or can stop it completely. Such components may in particular be catalyst poisons. Known components which can have a negative influence on the copolymerization reaction are, for example, sulfur, oxygen and oxygen compounds, for example water. A chemical treatment might be effected, for example, by removing the undesired components with another compound which can be removed easily from the mixture. For example, water can be removed from such mixtures by reaction with alkali metals. A physical treatment might, for example, be a thermal treatment, for example a distillation, or else a filtration, decantation or the like, or be a combination thereof. Particular preference is given to purifying the 3-methylbut-1-ene used by a coupled recondensation and stirring with triisobutylaluminum (TIBA).

It may be advantageous when 3-methylbut-1-ene which has been obtained by water elimination from 3-methylbutanol is used in the process according to the invention. This 3-methylbut-1-ene has the advantage that it can be used directly without performing a chemical purification step. In the process according to the invention, particular preference is given to using 3-methylbut-1-ene which is obtained by the steps of
a) hydroformylating isobutene to 3-methylbutanal,
b) hydrogenating the 3-methylbutanal to 3-methylbutanol and
c) eliminating water from 3-methylbutanol,
the 3-methylbut-1-ene obtained from step c) preferably being used directly without performing a chemical purification step.

The hydroformylation in step a) can be performed in a known manner. Preference is given to performing the hydroformylation in the presence of a rhodium complex catalyst. Suitable ligands are, for example, phosphite or phosphine ligands, preferably substituted or unsubstituted triphenylphosphines or triphenyl phosphites, preferably triphenylphosphine or triphenyl phosphite. The process step of hydroformylation can be performed, for example, as described in EP 0 562 451 or DE 026 27 354. The reaction temperatures are preferably 70 to 150° C., preferentially 100 to 130° C. The process pressures are preferably 2 to 20 MPa, preferentially 3 to 6 MPa.

The ligands or complex catalysts used may in particular be those as have been described in EP 0 155 508 (UCC), EP 0 213 639 (UCC), EP 0 214 622 (UCC), EP 0 471 071 (BASF), EP 1 099 677 (OXENO), EP 1 099 678 (OXENO) or EP 1 201 675 (OXENO). Particularly suitable rhodium complex catalysts with monodentate phosphite ligands are, for example, triaryl phosphites whose aryl groups both have a bulky group in the ortho-position to the phosphite oxygen and are substituted in the m- or p-position, for example tris(2,4-di-tert-butyl-phenyl) phosphite. The hydroformylation of isobutene using a catalyst system which consists of rhodium and a bisphosphite is described, for example, in the U.S. Pat. No. 4,668,651, U.S. Pat. No. 4,769,498 and WO 85/03702. Reference is made explicitly to all documents mentioned, whose disclosure content shall be part of the subject matter of the present description.

For the hydrogenation, the catalyst used in process step b) may, for example, be nickel, copper, copper/nickel, copper/chromium, copper/chromium/nickel, zinc/chromium, nickel/molybdenum catalysts. The catalysts may be unsupported, or the hydrogenation-active substances or their precursors may be applied to supports, for example silicon dioxide or aluminum oxide. Preferred catalysts over which the hydroformylation mixtures are hydrogenated each comprise 0.3 to 15% by mass of copper and nickel, and, as activators, 0.05 to 3.5% by mass of chromium and advantageously 0.01 to 1.6% by mass, preferably 0.02 to 1.2% by mass, of an alkali component on a support material, preferably aluminum oxide and silicon dioxide. The quantitative data are based on the catalyst which is yet to be reduced. The alkali component is optional. The catalysts are used advantageously in a form in which they offer a low flow resistance, for example in the form of granules, pellets or shaped bodies, such as tablets, cylinders, strand extrudates or rings. They are appropriately activated before use, for example by heating in a hydrogen stream.

The hydrogenation, preferably a liquid phase hydrogenation, is performed preferably at a total pressure of 0.5 to 50 MPa, preferably of 1.5 to 10 MPa. A hydrogenation in the gas phase can also be performed at lower pressures, in which case correspondingly large gas volumes are present. When a plurality of hydrogenation reactors are used, the total pressures in the individual reactors may be the same or different within the pressure limits mentioned. In the hydrogenation in process step b), the reaction temperatures in liquid or gaseous phase may generally be 120 to 220° C., in particular 140 to 180° C. Such hydrogenations are described, for example, in patent applications DE 198 42 369 and DE 198 42 370, to which reference is made here explicitly.

The hydrogenation is performed preferably in the presence of water. The water required may be present in the reactor feed. However, it is also possible to feed water into the hydrogenation apparatus at a suitable point. In the case of gas phase hydrogenation, water is appropriately supplied in the form of steam. A preferred hydrogenation process is liquid phase hydrogenation with addition of water, as described, for example, in DE 100 62 448. Particular preference is given to performing hydrogenation at a water content of 0.05 to 10% by mass, in particular 0.5 to 5% by mass, very particularly 1 to 2.5% by mass. The water content is determined in the hydrogenation effluent.

3-Methylbut-1-ene is prepared by water elimination in process step c) from the 3-methylbutan-1-ol obtained after the hydrogenation in process step b). The dehydration can be performed in the gas or mixed liquid/gas phase. Process step c) can be performed continuously or batchwise. Process step c) can be performed over suspended catalysts or catalysts in piece form arranged in a fixed bed. Owing to the easy removal of the reaction products from the reaction mixture, the water elimination is performed preferably over solid catalysts in the temperature range of 200 to 500° C. in the gas or mixed gas/liquid phase. Particular preference is given to performing a continuous dehydration over a catalyst arranged in a fixed bed. The catalysts used may be oxides of the alkaline earth metals, of aluminum, of indium, of gallium, of silicon, of scandium, of yttrium, of lanthanum, of titanium, of zirconium, of thorium, and of the rare earths. It is also possible to use mixed oxides and combinations of the above oxides. In some catalysts, a certain acidity can be established by adding alkali metal oxides.

The scientific technical literature discloses, for example, the following suitable catalysts:

$NiO/Al_2O_3$; $CuO/Al_2O_3$; $Al_2O_3$ (J. Mol. Catal. A. Chem. (1997), 121 (2-3), p. 157-159);

$ZrO_2$; sulfated $ZrO_2$ (J. Mol. Cat. A. Chem (1997), 118 (1), p. 88-89);

$Al_2O_3$; $CO_2O_3$; $ThO_2$; $In_2O_3$ (J. Catal. (1988), 110 (2), p. 416-418);

$HfO_2/ZrO_2$ (J. Phys. Chem. (1980), 84 (1), 55-56);

$Al_2O_3/Na_2O$; $ThO_2$ (J. Catal. (1981), 68 (2), p. 383-387);

$ThO_2$ (J. Org. Chem. (1967), 32 (11), 3386-3389);

$La_2O_3$ (Z. Phys. Chem. (1985), 144, p. 157-163);

$Ga_2O_3$ (J. Org. Chem. (1977), 44 (13), p. 2142-2145);

$ThO_2$; $Al_2O_3$ (J. Org. Chem. (1972), 37 (8), p. 1240-1244).

Preference is given to selecting the catalysts and the reaction conditions in such a way that the formation of by-products, for example of ethers, and the isomerization of the 1-olefins formed to olefins with internal double bonds are largely prevented. For the preparation of 3-methylbut-1-ene, preference is therefore given to using basic or strongly basic catalysts. The catalysts used with preference may comprise, as main components, aluminum oxide ($Al_2O_3$) and/or zirconium oxide ($ZrO_2$), and also alkali metal and/or alkaline earth metal oxides. As further components, the catalyst may contain titanium dioxide, silicon dioxide and/or thorium oxide at 0.01 to 3% by mass, preferably 0.5 to 5% by mass.

The proportion of basic metal oxides (hydroxides are converted to oxides) in the catalyst is preferably 0.01 to 10% by mass, more preferably 0.1 to 5% by mass, especially preferably 0.1 to 3% by mass. Preferred alkali metal oxides are sodium oxide and/or potassium oxide. The alkaline earth metal oxides used are preferably magnesium oxide, strontium oxide and/or barium oxide. Particular preference is given to effecting the water elimination in process step c) over a solid catalyst which consists in a formal sense of aluminum oxide and barium oxide. The catalyst used in process step c) is most preferably a 1'-aluminum oxide modified with barium oxide (BaO), which consists in a formal sense of barium oxide and aluminum oxide.

Preference is given to using γ-aluminum oxides having a BET surface area of 80 to 350 m²/g, preferably 120 to 250 m²/g (determined by $N_2$ absorption to DIN 66131). The catalysts are prepared by known methods. Common methods are, for example, precipitation, impregnation or spraying of an $Al_2O_3$ body with an appropriate salt solution and subsequent calcination.

It may likewise be advantageous when catalysts as described in DE 103 59 628 are used and have a proportion of zirconium dioxide of 80 to 99 parts by mass, of yttrium oxide of 0.5 to 10 parts by mass and of alkali metal or alkaline earth metal oxides of 0.1 to 3 parts by mass.

In the continuous water elimination, different process variants can be used. Process step c) can be performed, for example, adiabatically, polytropically or virtually isothermally, i.e. with a temperature difference of typically less than 10° C. The process step can be performed in one or more stages. In the latter case, all reactors, appropriately tubular reactors, can be operated adiabatically or virtually isothermally. It is likewise possible to operate one or more reactors adiabatically and the others virtually isothermally. Preference is given to operating the water elimination in straight pass. However, it can also be operated with product recycling. In the case of operation in straight pass, the specific catalyst hourly space velocity is 0.01 to 30 kg, preferably 0.1 to 10 kg, of alcohol per kg of catalyst and per hour. In the water elimination in process step c), the temperature in the catalyst layer is preferably 200 to 450° C., in particular 250 to 400° C. The water elimination (dehydration) can be performed under reduced pressure, elevated pressure or at standard pressure.

The 3-methylbutanol can be conducted into the dehydration reactor in pure form or in dilution. The diluents used may be inert gases or gas mixtures, for example nitrogen, hydrogen, carbon monoxide, carbon dioxide, synthesis gas, methane or steam, or organic solvents which are inert under reaction conditions and can be removed easily from the reaction effluent.

In order to achieve very high selectivity for 3-methylbut-1-ene formation, it has been found to be advantageous when the aim is only partial conversion of the alcohol used. At a conversion of 99%, for example, a selectivity of 92% can be achieved. Preference is given to performing process step c) in such a way that the conversion in straight pass is at least 30%, preferably 30 to 99% and preferentially 30 to 90%.

The product obtained from process step c) is a mixture comprising 3-methylbut-1-ene. In process step c), preference is given to obtaining a mixture from which 3-methylbut-1-ene is removed. The reaction mixture can, if appropriate after water removal, be separated by distillation into 3-methylbutan-1-ol, 3-methylbut-1-ene and by-products.

Between or after steps a), b) and/or c), one or more workup step(s) can be performed. Preference is given to performing those workup steps in which the desired products are separated from unconverted reactants, by-products and/or catalysts by physical methods, for example decanting, filtration, extraction or distillation. Suitable separation processes are known to those skilled in the art and it is within the ability of the person skilled in the art to select suitable separating methods and parameters for a separating problem.

It is possible by the process according to the invention to prepare copolymers of 3-methylbut-1-ene with ethene and/or propene, especially with ethene or propene. Depending on the process parameters used, it is possible to prepare copolymers with very different properties. It is possible by the process according to the invention with particular preference to prepare the inventive copolymers which contain 3-methylbut-1-ene and ethene and/or propene as monomers.

In the inventive copolymers containing 3-methylbut-1-ene, the further monomer present is ethene and/or propene, preferably ethene or propene, and the monomers present are preferably exclusively 3-methylbut-1-ene and ethene or propene, the proportion of the incorporated 3-methylbut-1-ene is 0.1 to 40 mol %, preferably 0.1 to 36 mol %, preferentially 0.1 to 10 mol %, more preferably 0.5 to 10 mol % and most preferably 1 to 5 mol %, and the copolymer has a melting point of room temperature (20° C.) or below room temperature to 130° C.

The inventive copolymers may have a molar mass $M_w$ (weight-average molar mass) of 2500 to 2 200 000 g/mol, preferably of 5000 to 500 000 g/mol. The molar mass can be determined by gel permeation chromatography. In the context of the present invention, the molar masses were determined with a gel permeation chromatograph from Waters, type: High-temperature Alliance GPCV 2000. The solvent used was 1,2,4-trichlorobenzene. Four Styragel columns (HT6, HT5, HT4, HT3) and a precolumn were used. The column material used was styrene-divinylbenzene=SDV (from PSS9)/Styragel (from Waters). The flow rate was 1 ml/min, and the measurements were effected at 140° C. In each case 0.15 to 0.2 ml of sample solution with a concentration of copolymers of 0.2% by mass were injected. With the aid of narrow-distribution polystyrene standards (from PSS), the column set was calibrated. The retention times were assigned to the polystyrene molecular weights and accompanying K and α values via fifth-order polynomials using universal calibration. The detector used was an internal (RI) detector which was connected to an internal viscosity detector. The data were recorded and evaluated with the Waters Millenium32 GPC program (Version 3.20, from Waters).

The inventive copolymer preferably has one melting point (if two melting points exist, the higher melting point) of below room temperature to 130° C., preferably of room temperature to 130° C., preferentially of 80 to 125° C., more preferably of 90 to 120° C. and most preferably of 100 to 115° C., in particular of 105 to 115° C. In the case of the ethene/3-methylbut-1-ene copolymers, a lowering of the melting point by about 30° C. can be achieved with an incorporation of 2.8 mol % of 3-methylbut-1-ene. The existence of two melting points relatively close to one another in the case of propene/3-methylbut-1-ene copolymers is attributed in the literature to recrystallization processes and to the presence of two crystalline phases during the DSC measurement; cf., for example, Graef et al., Journal of Polymer Science: Part A: Polymer Chemistry, 2002, 40, 128-140.

A particularly preferred inventive copolymer contains propene as a monomer, the proportion of the incorporated 3-methylbut-1-ene being 1 to 10 mol % and the melting point being 90 to 125° C. Such a copolymer preferably has a molar mass $M_w$ of 6500 to 8500 g/mol.

A further preferred inventive copolymer contains ethene as a monomer, the proportion of the incorporated 3-methylbut-1-ene being 0.5 to 6 mol % and the melting point being 90 to 130° C., in particular 105 to 130° C. Such a copolymer preferably has a molar mass $M_w$ of 10 000 to 500 000 g/mol, in particular 15 000 to 500 000 g/mol.

A very particularly preferred copolymer contains ethene as a monomer, the proportion of the incorporated 3-methylbut-1-ene being 3 to 6 mol % and the melting point being preferably 90 to 115° C., preferably 105 to 115° C. This copolymer preferably has a molar mass $M_w$ of 15 000 to 75 000 g/mol. Such a copolymer can be used as LLDPE (linear low-density polyethylene). The inventive LLDPE which has a proportion of 3-methylbut-1-ene incorporated of 3 to 6 mol % can be used, for example, for the production of films and foils.

The aforementioned inventive copolymers are preferably obtainable by the process according to the invention.

The inventive copolymers can be used to produce films or shaped bodies, especially injection-molded or extruded bodies. In particular, the inventive copolymers can be used in the form of films to produce boil-in-the-bag bags, sacks, sachets or carrier bags, as hollow bodies, for example as a vessel, bottle, tube, canister, vat or storage tank, or as an injection molding, for example as a bottle crate. In particular, the propene/3-methylbut-1-ene copolymers can, since they frequently have oily to tacky properties, be used as adhesives or oils.

The present invention will be illustrated in detail below with reference to the figures FIGS. 1 to 3 without any intention that the invention be restricted to the embodiments depicted by way of example there.

FIG. 1 shows a schematic of the polymerization apparatus used in the examples. The polymerization apparatus has a jacketed reaction vessel which is equipped with a thermometer sleeve 1, a septum-sealed ball valve 2, an argon/vacuum connection and an outlet valve 3, a stirrer 4, a manometer 5, a toluene feed 6, a mass flow regulator 7, purification columns 8, an alkene pressure vessel 9, a control system and a data recorder 10, and a connection to the attached gas bottle/lecture bottle comprising the 3-methylbut-1-ene 11. A heat carrier to heat or cool the contents of the reaction vessel can be passed through the jacket.

Figure 2:
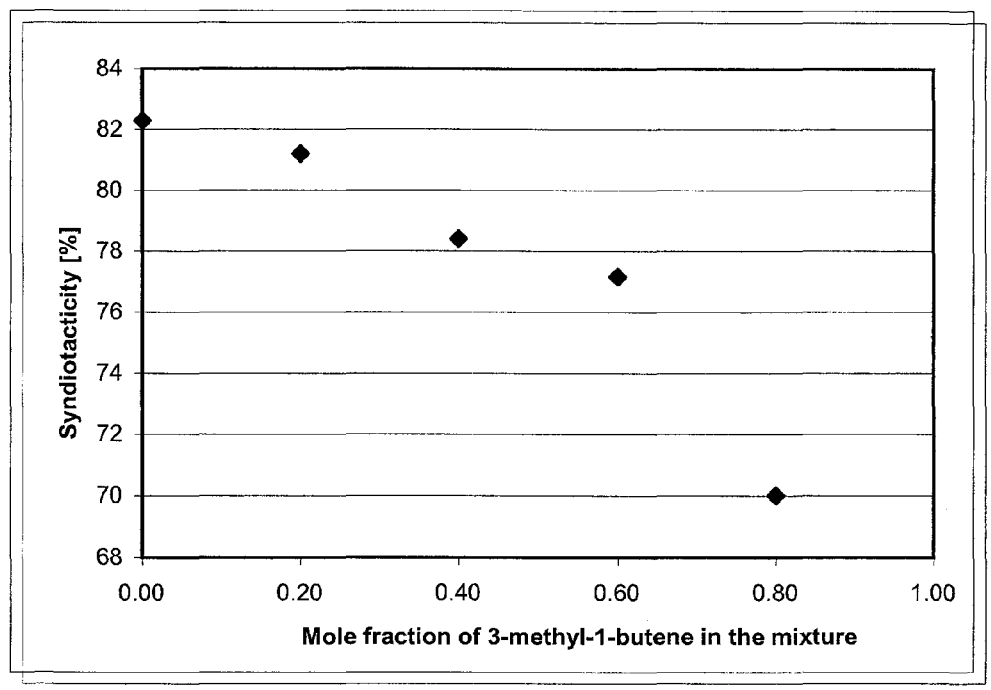

In FIG. 2, the resulting values for the syndiotacticity for the propene fraction of the propene/3-methylbut-1-ene copolymers is plotted as a function of the proportion of 3-methylbut-1-ene in the mixture for the polymers, prepared with [Me$_2$C(Cp)(Flu)]ZrCl$_2$]/MAO according to example 1a.

Figure 3:
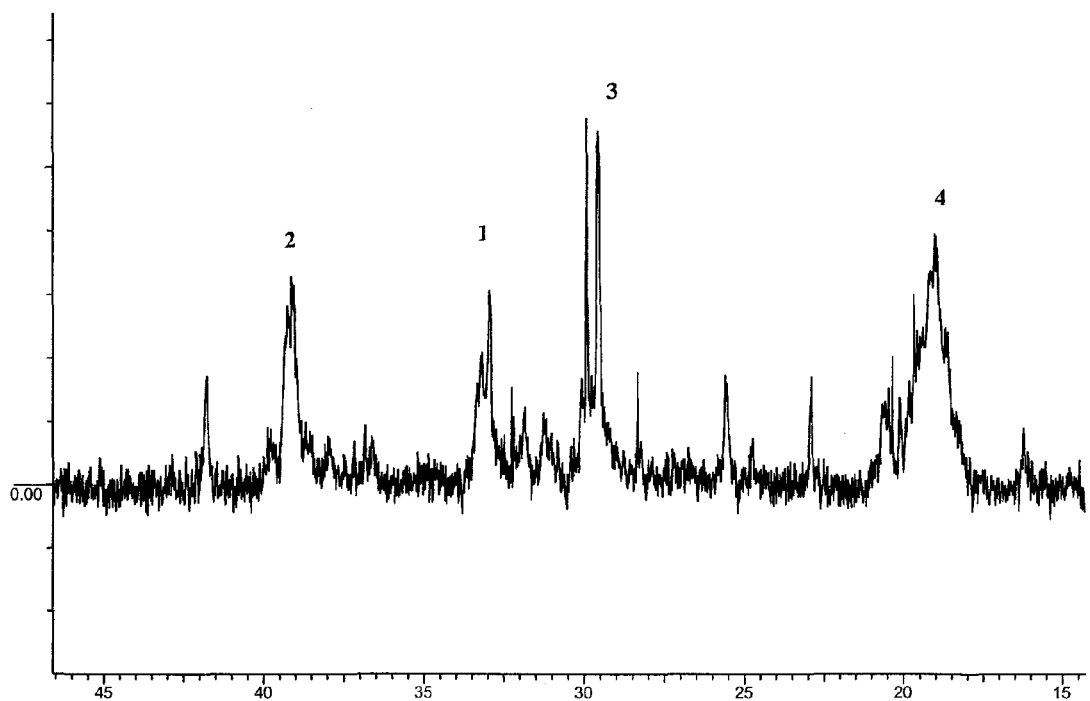

FIG. 3 shows a $^{13}$C NMR spectrum for poly-(3-methylbut-1-ene), prepared with [Me$_2$C(Cp)(Flu)ZrCl$_2$]/MAO according to example 1a.

The examples which follow are intended to illustrate the present invention without restricting the scope of application which is evident from the description and the claims.

Examples of the copolymerization of 3-methylbut-1-ene (3MB1) with ethene and propene The copolymerizations described below were performed semicontinuously in a 1 l glass autoclave from Büchi, in which pressures up to 0.6 MPa can be employed in a gas-tight manner. The mixing was effected by means of a propeller stirrer at 500 rpm driven indirectly by magnetic coupling. The precise construction of the apparatus can be taken from FIG. 1. The polymerization apparatus shown in FIG. 1 has a thermometer sleeve 1, a septum-sealed ball valve 2, argon/vacuum connection and outlet valve 3, stirrer 4, manometer 5, toluene feed 6, mass flow regulator 7, purification columns 8, alkene pressure vessel 9, control system and data recorder 10, and a connection to the attached gas bottle/lecture bottle comprising the 3-methylbut-1-ene 11.

Performance of the Copolymerization

Before each copolymerization, the autoclave was baked out under reduced pressure (oil-pump vacuum) at 95° C. for at least 1 h and, in the course of this, flushed repeatedly with argon. Once the desired experiment temperature had been established, the autoclave was filled with 400 mg of methylaluminoxane (MAO) and 200 ml of toluene. The MAO was used as a solid which had been obtained from a 10% by mass toluenic solution (from Crompton) by filtration and subsequent condensation of the solvent and of any remaining trimethylaluminum present. Subsequently, the reactor was placed under vacuum again. The apparatus was then charged with 3-methylbut-1-ene. By means of checking the weight, the desired amount of 3-methylbut-1-ene was dissolved in toluene before standard pressure was restored again with argon. Subsequently, the system was saturated with the desired alkene pressure (ethene or propene pressure). The alkene pressure was adjusted such that no further monomer flowed in, i.e. no further monomer flowed up to the start of the polymerization. The polymerization was started by injecting the toluenic catalyst solution through the septum by means of a gas-tight syringe. In the propene/3-methylbut-1-ene copolymerization, pressures of 0.03 MPa or 0.07 MPa were established, and, in the ethene/3-methylbut-1-ene copolymerization, pressures of 0.025 to 0.4 MPa.

Before use of the 3-methylbut-1-ene which had been purchased from Aldrich, it was purified. To this end, the 3-methyl-1-butene was first condensed into a three-neck flask, stirred with triisobutylaluminum (TIBA) with ice-water cooling for several hours (approx. 4 h) and then condensed into a lecture bottle.

The alkene was replenished during the polymerization by means of a pressure reducer, and the alkene consumption was monitored by means of a mass flow regulator attached to a computer. Since the apparatus did not permit continuous replenishment of the comonomer, the polymerization conditions were maintained such that the conversion of 3-methylbutene was not more than about 5%.

The polymerization was terminated by interrupting the alkene feed, destroying the catalyst by injecting ethanol and releasing the elevated pressure. The reaction solution was subsequently transferred to a beaker.

Workup of the Polymers

To remove catalyst residues, the reaction solution was stirred overnight with an aqueous ethanolic hydrochloric acid solution which comprised concentrated hydrochloric acid, ethanol and water in a mass ratio of 1:2:7. Subsequently, both the toluene-soluble and the toluene-insoluble polymers were neutralized with a 5% by mass aqueous sodium hydrogencarbonate solution and finally washed to neutrality by washing three times with demineralized water. Toluene-insoluble polymers were subsequently filtered off and washed with ethanol. In the case of toluene-soluble polymers, the mixture was concentrated to about 50 ml on a rotary evaporator and, if possible, precipitation was effected with ethanol. Subsequently, the mixture was likewise filtered through a Büchner funnel and washed with ethanol. The polymers were dried to constant mass in a vacuum drying cabinet at 40° C.

EXAMPLE 1

Copolymerization of 3-methylbut-1-ene with propene

For the polymerization series with propene, the catalysts [Me$_2$C(Cp)(Flu)]ZrCl$_2$ (formula II) (example 1a) and rac-[Me$_2$C(Ind)$_2$]ZrCl$_2$ (formula III) (example 1b) were used.

This compound can be purchased, for example, from Boulder or Aldrich. The catalyst of the formula II can also be prepared as described by J. A. Ewen, R. L. Jones, A. Razavi in J. Am. Chem. Soc., 1988, 110, 6255 or as described in EP 0 354 391. The catalyst of the formula III can also be prepared as described by W. Spaleck, M. Antberg, V. Dolle, R. Klein, J. Rohrmann and A. Winter in New. J. Chem 14, 6 (1990) 499. The reaction conditions under which the concentration series and temperature series in examples 1a and 1b were performed can be taken from table 1.

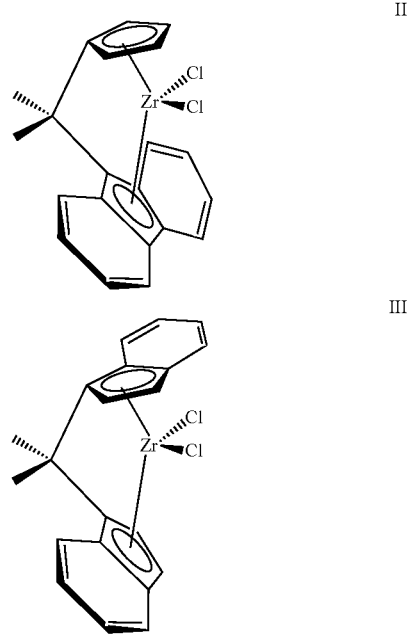

TABLE 1

Reaction conditions of the propene/3-methylbut-1-ene copolymerizations and of the 3-methylbut-1-ene copolymerizations

| | Concentration series | Temperature series |
|---|---|---|
| Temperature | 30° C. | 15, 30, 45, 60° C. |
| Time | 1 h (3MB1 homopolymerization: 6 h) | 1 h |
| Mole fraction of 3MB1 in the mixture ($X_{3MB1}$) | 0.00; 0.20; 0.40; 0.60; 0.80; 1.00 | 0.80 |
| Propene pressure | 0.07 MPa (for $X_{3MB1}$ = 0.80: 0.035 MPa) | 0.03 MPa |
| Amount of 3MB1 | 0 to 10.66 g | 4.94 to 13.66 g |
| Total concentration | 0.4 to 1 mol/l | 0.60 to 1.22 mol/L |
| Toluene | 200 ml | 200 ml |
| MAO | 400 mg | 400 mg |
| Catalyst | 2 · 10$^{-3}$ mmol (3MB1 homopolymerization: 1 · 10$^{-2}$ mmol) | 2 · 10$^{-3}$ mmol |

EXAMPLE 1a

Copolymerization in the Presence of [Me$_2$C(Cp)(Flu)]ZrCl$_2$ as a Catalyst

In tables 2 and 3 below, the results of the copolymerization of 3-methylbut-1-ene with propene in the presence of [Me$_2$C(Cp)(Flu)]ZrCl$_2$ as a catalyst are reported.

TABLE 2

Overview of the polymerization results with the catalyst [Me$_2$C(Cp)(Flu)]ZrCl$_2$ for the concentration series at a polymerization temperature of 30° C.

| Proportion of 3-methylbutene in the mixture | Activity [kg$_{polymer}$/ (mol$_{cat}$ · h · mol$_{monomer}$ · l$^{-1}$)] | Incorporation of 3-methylbut-1-ene [mol %] | Melting point $T_{m1}/T_{m2}$ [° C.]/glass transition temperature [° C.] | Molar mass $M_w$ [g/mol] |
|---|---|---|---|---|
| 0.00 | 2019 | 0 | 122.2/133.3/0.7 | 66100 |
| 0.20 | 1976 | <0.5 | 123.8/134.5/1.4 | 77950 |
| 0.40 | 1114 | <0.5 | 120.5/132.0/−0.7 | 68250 |
| 0.60 | 318 | <1 | 119.0/131.2/−2.0 | 65400 |
| 0.80 | 73 | <1 | 102.0/116.2/−5.0 | 51200 |
| 1.00 | 2 | 100 | — | — |

$M_w$ = weight-average molar mass

TABLE 3

Overview of the polymerization results with the catalyst [Me$_2$C(Cp)(Flu)]ZrCl$_2$ for the temperature series at X$_{3MB1}$ = 0.80.

| Polymerization temperature [° C.] | Activity [kg$_{polymer}$/ (mol$_{cat}$ · h · mol$_{monomer}$ · l$^{-1}$)] | Incorporation of 3-methylbut-1-ene [mol %] | Melting point $T_{m1}/T_{m2}$ [° C.]/glass transition temperature [° C.] | Molar mass $M_w$ [g/mol] |
|---|---|---|---|---|
| 15 | 49 | <1 | 128.5/117.2/−1.1 | 68000 |
| 30 | 156 | <1 | 118.6/105.0/−0.8 | 59600 |
| 45 | 158 | <1 | 97.5/−1.5 | 39700 |
| 60 | 68 | <1 | 96.8/−0.5 | 23000 |

The second melting points reported in tables 2 and 3 are suspected to be attributable to recrystallization processes during the measurement.

As can be discerned from table 2, a significant decline in the activity from about 2000 kg/(mol$_{cat}$·h·mol$_{monomer}$·l$^{-1}$) in the case of the pure propene polymerization to about 73 kg/(mol$_{cat}$·h·mol$_{monomer}$·l$^{-1}$) at X$_{3MB1}$=0.80 is found with increasing proportion of 3-methylbut-1-ene in the mixture. The homopolymerization of 3-methylbut-1-ene proceeds with a low activity of 2 kg/(mol$_{cat}$·h·mol$_{monomer}$·l$^{-1}$) (the unit mol$_{monomer}$·l$^{-1}$ represents the concentration c$_{monomer}$).

As can be discerned from table 3, there is an activity maximum between 30 and 45° C. for the polymerization temperature.

It can be discerned from both tables that a decline in the weight-average molar mass M$_w$ is observed with increasing proportion of 3-methylbut-1-ene in the mixture. The molar mass M$_w$ likewise falls with rising polymerization temperature, the influence here being particularly great, since M$_w$ declines from 68 000 g/mol at a polymerization temperature of 15° C. to about two thirds (23 000 g/mol) at a polymerization temperature of 60° C. This might, for example, be due to increased occurrence of termination reactions. The molar masses of the copolymers and of the polypropylene were determined as described above by means of gel permeation chromatography.

The thermal properties were determined by means of DSC (Differential Scanning Calorimetry). To this end, a sample of 7 to 12 mg of the copolymer was analyzed in a Mettler Toledo DSC 821$^e$ differential calorimeter with a heating rate of 20° C./min in a range of −100 to +200° C. From the data obtained by heating twice, those of the second heating were used. In the case of glass transitions, the samples were analyzed once again with a slower heating rate (10° C./min). The peaks obtained in the recording of the curve were evaluated electronically with the program STARe 8.01 from Mettler Toledo. What was notable in the results of the DSC analyses was the occurrence not just of one melting peak for one polymer, but rather two melting peaks which merged into one another were found for the resulting polymers. This phenomenon known from the literature for syndiotactic polypropylene is attributable to a recrystallization process (cf. Graef et al., *Journal of Polymer Science: Part A: Polymer Chemistry*, 2002, 40, 128-140; De Rosa et al., *Macromolecules*, 1998, 31, 6206-6210).

In addition, as well as the melting peaks, weak glass transitions can be detected, which indicate the presence of amorphous regions. For different proportions of 3-methylbut-1-ene in the mixture, a slight fall in the glass transition temperatures could be detected for the resulting polymers, and also a clearer fall in the melting points. With rising polymerization temperature and falling molar mass, a distinct decline in the melting point was observed.

With increasing proportion of 3-methylbut-1-ene in the mixture, the proportion of syndiotactic pentads falls significantly: while it is still 82% in pure propene polymerization, it falls to a proportion of approx 70% to 80 mol % of 3-methylbut-1-ene in the mixture (FIG. 2). The determination was effected by means of $^{13}$C NMR spectroscopy. It was assumed that there are no signals in the methyl region of the propene as a result of the comonomer.

Even though no signals attributable to incorporated 3-methylbut-1-ene were detectable in the $^{13}$C NMR spectra, it has to be concluded merely owing to the falling molar masses and melting points with rising proportion of 3-methylbut-1-ene in the mixture that not just "pure" polypropylene but indeed propene/3-methylbut-1-ene copolymers, albeit only with low incorporation, have been prepared, and that the corresponding signals in the NMR spectrum have been lost in the noise.

In contrast, the homopolymerization of 3-methylbut-1-ene succeeded. A corresponding $^{13}$C NMR spectrum of poly(3-methylbut-1-ene) is shown in FIG. 3. This FIG. 3 shows a $^{13}$C NMR spectrum for poly(3-methylbut-1-ene) prepared with [Me$_2$C(Cp)(Flu)ZrCl$_2$]/MAO. The numbers specify which peak is attributable to which carbon atom in the poly(3-methylbut-1-ene) (formula V).

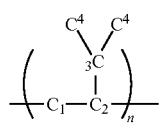

V

The signals for poly(3-methylbut-1-ene) were assigned on the basis of a publication (A. Borriello, V. Busico, R. Cipullo, *Macromol. Rapid Commun.*, 1996, 17, 589-597) and of a patent (T. Asabuma, Y. Tamai, Jpn. Kokai Tokkyo Koho (1991), JP 03200812 A2), although the spectrum in this document is greatly simplified.

It was possible to prove the incorporation of 3-methylbut-1-ene in the polymer by means of Pyro-GC-MS. In this method, the polymer is pyrolized, and the fragments are separated by gas chromatography and analyzed with a mass spectrometer. It is possible by means of one characteristic peak in each case for the two homopolymers and from their ratio in the copolymer chromatograms—with reference to the peak ratios and the incorporations determined by means of $^{13}$C NMR spectroscopy for the copolymers prepared with rac-[Me$_2$C(Ind)$_2$]ZrCl$_2$— to draw conclusions on the amount of the comonomer incorporated. Accordingly, propene/3-methylbut-1-ene copolymers were obtained, but their incorporation, estimated at well below one percent, is extremely low even for the copolymers obtained at $X_{3MB1}=0.80$.

EXAMPLE 1b

Copolymerization in the Presence of rac-[Me$_2$C(Ind)$_2$]ZrCl$_2$ as a Catalyst Tables 4 and 5 below report the results of the copolymerization of 3-methylbut-1-ene with propene in the presence of rac-[Me$_2$C(Ind)$_2$]ZrCl$_2$ as a catalyst.

TABLE 4

Overview of the polymerization results with the catalyst rac-[Me$_2$C(Ind)$_2$]ZrCl$_2$ for the concentration series at a polymerization temperature of 30° C.

| Proportion of 3-methylbutene in the mixture | Activity [kg$_{polymer}$/ (mol$_{cat}$ · h · mol$_{monomer}$ · l$^{-1}$)] | Incorporation of 3-methylbut-1-ene [mol %] | Melting point [° C.]/glass transition temperature [° C.] | Molar mass M$_w$ [g/mol] |
|---|---|---|---|---|
| 0.00 | 4088 | 0.0 | 133.9 | 9300 |
| 0.20 | 4230 | 0.0 | 130.3 | 8200 |
| 0.40 | 3376 | 1.0 | 125.1 | 8100 |
| 0.60 | 1967 | 3.5 | 116.9/−10.2 | 7550 |
| 0.80 | 1103 | 8.9 | 88.5/−12.5 | 6800 |
| 1.00 | 15 | 100 | 295.2 | 9300 |

TABLE 5

Overview of the polymerization results with the catalyst rac-[Me$_2$C(Ind)$_2$]ZrCl$_2$ for the temperature series at $X_{3MB1} = 0.80$.

| Polymerization temperature [° C.] | Activity [kg$_{polymer}$/ (mol$_{cat}$ · h · mol$_{monomer}$ · l$^{-1}$)] | Incorporation of 3-methylbut-1-ene [mol %] | Melting point [° C.]/glass transition temperature [° C.] | Molar mass M$_w$ [g/mol] |
|---|---|---|---|---|
| 15 | 517 | 8.5 | 88.5/−13.2 | 14500 |
| 30 | 843 | 9.3 | 91.1/−9.8 | 8200 |
| 45 | 1534 | 10.0 | 89.4/−10.2 | 7500 |
| 60 | 2283 | 9.1 | 66.3/−17.5 | 8700 |

As can be discerned from table 4, a distinct fall in the activity was found here too with increasing proportion of the 3-methylbut-1-ene in the mixture, even though the activities were overall higher than for the catalyst [Me$_2$C(Cp)(Flu)]ZrCl$_2$. What is particularly notable is the still comparatively high activity of about 1100 kg/(mol$_{cat}$·h·mol$_{monomer}$·l$^{-1}$) at X$_{3MB1}$=0.80, which corresponds to about fifteen times the value of the activity found for the C$_S$-symmetric catalyst [Me$_2$C(Cp)(Flu)]ZrCl$_2$. In the temperature range of 15 to 60° C. investigated, an activity rising with increasing polymerization temperature was observed. From 15° C. with an activity of about 500 kg/(mol$_{cat}$·h·mol$_{monomer}$·l$^{-1}$) at X$_{3MB1}$=0.80, it experiences virtually a five-fold increase up to 60° C. with about 2300 kg/(mol$_{cat}$·h·mol$_{monomer}$·l$^{-1}$). This catalyst too succeeds in homopolymerizing 3-methylbut-1-ene, actually with a slightly higher activity of 15 kg/(mol$_{cat}$·h·mol$_{monomer}$·l$^{-1}$).

The molar masses are below 10 000 g/mol for all proportions of 3-methylbut-1-ene in the mixture and are thus relatively low. With increasing mole fraction of the 3-methylbut-1-ene in the mixture, a slight fall in the molar masses can be detected. Determination of the molar mass of the poly(3-methylbut-1-ene) by means of GPC or viscometry was impossible owing to the insolubility of the polymer in various solvents even with strong heating. The molar masses of the copolymers and of the polypropylene were determined as described above by means of gel permeation chromatography.

The melting points fell by 45° C. from about 134° C. for the pure polypropylene to about 89° C. for X$_{3MB1}$=0.80 proportionally with the rising proportion of the 3-methylbut-1-ene in the polymer, which was simultaneously associated with a decrease in the molar masses. It was also notable that the copolymers exhibit glass transitions as well as the melting peak from a comonomer incorporation of about 3.5%.

The tacticity for the resulting copolymers is in the range of approx. 70 to 90% (isotacticity), i.e. the isotacticity falls with rising proportion of 3-methylbut-1-ene in the polymer. The tacticity was determined from the pentads in the methyl region (in the range of approx. 19.5 to 22.5 ppm) in the $^{13}$C NMR spectrum.

To determine the incorporation, it was first necessary to assign the signals from the $^{13}$C NMR spectrum taking account of the DEPT experiment (Distortionless Enhancement by Polarization Transfer). The incorporation was determined via the signal for the chain branching point of the isopropyl group relative to the signal of the CH branching point from the propene fraction. The determination was effected by means of the software ACD SpecView (Version 3.50) by hand by means of a peak integration. In the range investigated, a comonomer incorporation of up to about 9 mol % was achieved. For various polymerization temperatures, different proportions of incorporated comonomer were found. In the range investigated, the comonomer proportion in the polymer varied between 8.5 and 10 mol %.

It can be discerned from the above examples that a copolymerization of propene with 3-methylbut-1-ene is possible. Even though homopolymerization with the 3-methylbut-1-ene with this catalyst with low activity is possible, it was possible with the C$_S$-symmetric catalyst [Me$_2$C(Cp)(Flu)]ZrCl$_2$ only to prepare copolymers with extremely low incorporation, albeit noticeable influence on the polymer properties.

While the syndiotacticity decreases significantly here with increasing proportion of the 3-methylbut-1-ene in the mixture, the isotacticity of the polymers synthesized with rac-[Me$_2$C(Ind)$_2$]ZrCl$_2$ varies within the range of 90 to 70%, while the isotacticity falls with increasing proportion of 3-methylbut-1-ene in the mixture. It was also possible with this catalyst to achieve significantly higher incorporation rates, which have a particularly marked effect on the melting point.

EXAMPLE 2

Copolymerization of 3-methylbut-1-ene with Ethene

In examples 2a to 2c, a series of experiments 2a to 2c in which the proportion of 3-methylbut-1-ene was varied was performed using three different catalysts. The reaction conditions for examples 2a to 2c can be taken from table 6.

TABLE 6

Reaction conditions of the ethene/3-methylbut-1-ene copolymerizations.

|  | Experiments 2a, 2b and 2c: Concentration series |
|---|---|
| Temperatures | 60° C. |
| Time | 45 min, except 12 min for X$_{3MB}$ = 0 or 0.4 and 5.5 h for X$_{3MB}$ = 1 |
| Mole fraction of 3MB1 in the mixture (X$_{3MB1}$) | 0.00; 0.40; 0.60; 0.80; 0.9; 0.95; 0.98 |
| Ethene pressure | 0.025 to 0.4 MPa (for X$_{3MB1}$ = 0.80: 0.035 MPa) |
| Amount of 3MB1 | 0 to 14.08 g |
| Total concentration | 0.3 to 1.02 mol/l |
| Toluene | 200 ml |
| MAO | 400 mg (6.90 mmol) |
| Catalyst | 7.5 × 10$^{-5}$ mmol (for X$_{3MB}$ = 0 and 0.4) 1.0 × 10$^{-4}$ mmol (X$_{3MB}$ = 0.6, 0.8, 0.9, 0.95 and 1) 3.75 × 10$^{-4}$ mmol (X$_{3MB}$ = 0.98) |

EXAMPLE 2a

Copolymerization with Catalyst [Me$_2$Si(Me$_4$Cp)(N$^{tert}$Bu)]TiCl$_2$

For the polymerization series with ethene, the catalyst [Me$_2$Si(Me$_4$Cp)(N$^{tert}$Bu)]TiCl$_2$ (formula IV) was used. The conditions under which the experiments 2a were performed taken from table 6. The catalyst of the formula IV can be prepared, for example, as described by J. Okuda in Chem. Ber. 1990, 123, 1649, or as described by F. Amor and J. Okuda in J. Organomet. Chem. 1996, 520, 245, or as described in EP 0 416 815 or U.S. Pat. No. 5,026,798. The results determined for experiment series 2a can be taken from table 7 below.

TABLE 7

Overview of the polymerization results with the catalyst [Me$_2$Si(Me$_4$Cp)(N$^{tert}$Bu)]TiCl$_2$ in experiment series 2a.

| Mole fraction of 3-methyl-butene in the mixture | Activity[kg$_{polymer}$/ (mol$_{Ti}$ · h · mol$_{monomer}$ · l$^{-1}$)] | Incorporation of 3-methyl-butene [mol %] | Melting point [° C.] | Molar mass M$_n$ [g/mol] | Molar mass M$_w$ [g/mol] | PD |
|---|---|---|---|---|---|---|
| 0.00 | 154400 | 0 | 138.9 | 393200 | 576800 | 1.5 |
| 0.40 | 148600 | 0.6 | 126.0 | 217400 | 482500 | 2.2 |
| 0.60 | 143200 | 0.9 | 119.7 | 146000 | 315600 | 2.2 |
| 0.80 | 60300 | 2.3 | 109.6 | 44300 | 87000 | 2.0 |
| 0.90 | 16700 | 4.2 | 96.5 | 20300 | 38100 | 1.9 |
| 0.95 | 6900 | 9.7 | 47.0 | 5500 | 9500 | 1.7 |
| 0.98 | 1400 | 17.3 | T$_G$ – 56.8 | 2300 | 2900 | 1.3 |

T$_G$ = glass transition temperature
PD = polydispersity
M$_n$ = number-average molar mass As can be discerned from table 7, the copolymerization exhibited a high dependence of the catalyst activity on the proportion of 3-methylbutene in the mixture. Owing to the large fall in the activity with increasing proportion of 3-methylbutene in the mixture, the attempt to homopolymerize 3-methylbutene was without success.

The incorporation behavior of the selected catalyst for the 3-methylbut-1-ene is relatively highly dependent on the proportion of the 3-methylbut-1-ene in the mixture. At low to medium proportions of 3-methylbut-1-ene in the mixture, there was virtually no incorporation. At 98 mol % 3-methylbut-1-ene in the mixture, however, an incorporation of 17.3 mol % of 3-methylbut-1-ene in the copolymer was achieved.

It was possible with the catalyst used to prepare ethene/3-methylbutene copolymers.

EXAMPLE 2b

Copolymerization with Catalyst [Ph$_2$Si(OctHFlu)(Ind)]ZrCl$_2$

For the polymerization series with ethene, the catalyst [Ph$_2$Si(OctHFlu)(Ind)]ZrCl$_2$ (formula V) was used. The conditions under which the experiments 2b were performed can be taken from table 6. The results determined in experiment 2b can be taken from table 8 below.

TABLE 8

Overview of the polymerization results with the catalyst [Ph$_2$Si(OctHFlu)(Ind)]ZrCl$_2$ of experiment series 2b.

| Mole fraction of 3-methylbutene in the mixture | Activity [kg$_{polymer}$/ (mol$_{Zr}$ · h · mol$_{monomer}$ · l$^{-1}$)] | Incorporation of 3-methylbutene [mol %] | Melting point [° C.] | Molar mass M$_n$ [g/mol] | Molar mass M$_w$ [g/mol] | PD |
|---|---|---|---|---|---|---|
| 0.00 | 108700 | 0 | 140.0 | 791800 | 2174800 | 2.7 |
| 0.20 | 145900 | 0.5 | 127.7 | 475900 | 1177700 | 2.5 |
| 0.40 | 45300 | 1.0 | 122.7 | 200800 | 499000 | 2.5 |
| 0.60 | 42200 | 2.3 | 109.0 | 191300 | 394800 | 2.1 |
| 0.80 | 15000 | 5.3 | 92.7 | 201600 | 420200 | 2.1 |
| 0.90 | 3800 | 9.7 | 63.7/(121.5) | 94800 | 197900 | 2.1 |
| 0.95 | 2000 | 13.2 | 44.9/(119.5) | 60000 | 119700 | 2.0 |
| 0.98 | 700 | 19.1 | T$_G$ – 48.5 | 45900 | 84100 | 1.8 |

T$_G$ = glass transition temperature. The values reported for the melting point in brackets are small additional melting peaks.
PD = polydispersity
M$_n$ = number-average molar mass With increasing incorporation of the 3-methylbutene, a fall in the melting points was detected. Up to an incorporation of about 4 mol % of 3-methylbut-1-ene, a linear low density polyethylene (LLDPE) was obtained (the melting point of LLDPE is typically in the range between about 100 and 130° C.). At an incorporation of 4.2 and 4.6 mol %, an ultra low-density polyethylene (ULDPE) was obtained (the melting point of ULDPE is typically about in the range of 90 to 100° C.). The copolymer with a comonomer incorporation of 17.3 mol % was completely amorphous even at room temperature.

The molar masses decreased by two powers of ten with increasing incorporation of the 3-methylbut-1-ene, so that a copolymer having a content of 3-methylbutene of 18 mol % can already be referred to as a virtually oligomeric compound.

As can be discerned from table 8, the copolymerizations exhibited a high dependence of the catalyst activity on the proportion of 3-methylbutene in the mixture. Owing to the large fall in the activity with increasing proportion of 3-methylbutene in the mixture, the attempt to homopolymerize 3-methylbutene was without success.

The incorporation behavior of the selected catalyst for the 3-methylbut-1-ene is relatively highly dependent on the proportion of the 3-methylbut-1-ene in the mixture. At low to medium proportions of 3-methylbut-1-ene in the mixture, there was relatively low incorporation. At 98 mol % of 3-methylbut-1-ene in the mixture, an incorporation of 19.1 mol % of 3-methylbut-1-ene in the copolymer was achieved.

With increasing incorporation of the 3-methylbutene, a fall in the melting points was detected. The molar masses decreased by two powers of ten with increasing incorporation of the 3-methylbut-1-ene. Generally, in the experiments in example 2b, copolymers with greater molar masses than in example 2a have been obtained. It has been shown that ethene/3-methylbutene copolymers can be prepared with the catalyst used.

EXAMPLE 2c

Copolymerization with Catalyst rac-[Me$_2$C(Ind)$_2$]ZrCl$_2$

For the polymerization series with ethene, the catalyst rac-[Me$_2$C(Ind)$_2$]ZrCl$_2$ (formula III) was used. The conditions under which the experiments 2c were performed can be taken from table 6. The results determined for the experiment series 2c can be taken from table 9 below.

TABLE 9

Overview of the polymerization results with the catalyst rac-[Me$_2$C(Ind)$_2$]ZrCl$_2$ in the experiment series 2c.

| Mole fraction of 3-methyl-butene in the mixture | Activity [kg$_{polymer}$/ (mol$_{Zr}$ · h · mol$_{monomer}$ · l$^{-1}$)] | Incorporation of 3-methyl-butene [mol %] | Melting point [° C.] | Molar mass M$_n$ [g/mol] | Molar mass M$_w$ [g/mol] | PD |
|---|---|---|---|---|---|---|
| 0.00 | 228800 | 0.0 | 131.9 | 19800 | 38500 | 1.9 |
| 0.20 | 290200 | 0.2 | 123.1 | 23800 | 44400 | 1.9 |
| 0.40 | 256000 | 2.4 | 113.9 | 17400 | 28900 | 1.7 |
| 0.60 | 187500 | 4.3 | 98.6/(125.0) | 18600 | 31400 | 1.7 |
| 0.80 | 79400 | 11.3 | 64.7/(126.8) | 18800 | 34000 | 1.8 |
| 0.90 | 30200 | 19.4 | T$_G$ – 48.9 | 15500 | 28100 | 1.8 |
| 0.95 | 20500 | 30.3 | T$_G$ – 40.0 | 13700 | 26000 | 1.9 |
| 0.98 | 6300 | 36.8 | T$_G$ – 26.3 | 14400 | 25800 | 1.8 |

T$_G$ = glass transition temperature. The values reported for the melting point in brackets are small additional melting peaks.
PD = polydispersity
M$_n$ = number-average molar mass As can be discerned from table 9, the copolymerization in this experiment too exhibited a high dependence of the catalyst activity on the proportion of 3-methylbutene in the mixture.

The incorporation behavior of the selected catalyst for the 3-methylbut-1-ene is relatively highly dependent on the proportion of the 3-methylbut-1-ene in the mixture. In contrast to the experiments in examples 2a and 2b, it was found in experiment series 2c that an incorporation of a double-digit percentage of 3-methylbut-1-ene is already achieved at a proportion of 80 mol % in the mixture. At 98 mol % of 3-methylbut-1-ene in the mixture, an incorporation of 36.8% was actually achieved.

In contrast to examples 2a and 2b, the molar masses of the copolymers obtained in example 2c varied within a relatively narrow range.

The polydispersity for the resulting copolymers was approx. 2. The copolymers obtained in the Ziegler-Natta catalysis, in contrast, have significantly higher values for the polydispersity. The values M$_n$ (number-average molecular weight) and M$_w$ (weight-average molecular weight) required to determine the polydispersity were determined by means of GPC.

A low polydispersity is synonymous with a relatively narrow molar mass distribution. It is therefore possible by the process according to the invention to obtain copolymers which have a narrow molar mass distribution. Inventive ethene copolymers preferably have a polydispersity between 1.2 and 2.8, preferentially between 1.6 and 2.

The invention claimed is:
1. A process for preparing at least one copolymer comprising propene as a monomer and 3-methylbut-1-ene as a comonomer, the process comprising:
copolymerizing a reaction mixture comprising propene and 3-methylbut-1-ene in the presence of a catalyst of formula (I)

and aluminum-comprising compound or boron-comprising compound as a cocatalyst, to obtain the copolymer, wherein a proportion of the 3-methylbut-1-ene in the copolymer is 1 to 10 mol %,
wherein the copolymer has a melting point of 90 to 125° C.,
wherein the copolymer has a molar mass of 6500 to 8500, and
wherein, in the catalyst of formula (I)
Cp* is selected from the group consisting of a substituted cyclopentadienyl, an unsubstituted cyclopentadienyl, a substituted indenyl, an unsubstituted indenyl, a substituted tetrahydroindenyl, an unsubstituted tetrahydroindenyl, a substituted octahydrofluorenyl, an unsubstituted octahydrofluorenyl, a substituted flourenyl, and an unsubstituted fluorenyl group,
Y is selected from the group consisting of a substituted cyclopentadienyl, an unsubstituted cyclopentadienyl, a substituted indenyl, an unsubstituted indenyl, a substituted tetrahydroindenyl, an unsubstituted tetrahydroindenyl, a substituted octahydrofluorenyl, an unsubstituted octahydrofluorenyl, a substituted flourenyl, an unsubstituted fluorenyl group, or an anionic ligand group comprising nitrogen, phosphorus, oxygen, or sulfur, and up to 20 atoms which are not hydrogen,
or Cp* and Y are joined to one another covalently or via a Z group,
wherein Z is boron or a group which comprises an element of group 14 of the Periodic Table of the Elements, and has up to 20 atoms which are not hydrogen atoms,
M is a metal of group 3 to 10, with the exception of scandium, or of the lanthanoids, of the Periodic Table of the Elements, X is in each case independently a halogen atom, a pseudohalogen, a hydrogen atom, a silyl group, a phosphide, a sulfide, or an organic radical, and m is a number which is sufficient to saturate the valences of M with the X, an aluminum- or boron-comprising compound as a cocatalyst.

2. The process of claim 1, wherein the catalyst is a catalyst of formula (Ia)

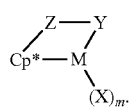

(Ia)

3. The process of claim 2, wherein the catalyst comprises a catalyst wherein Z is a CR²R³ group or an SiR²R³ group, wherein R² and R³ are the same or different and are each hydrogen, an aromatic radical, or an aliphatic radical.

4. The process of claim 1, wherein the aluminum-comprising compound is present, and is methylaluminoxane (MAO).

5. The process of claim 1, wherein the copolymerizing is performed at a molar ratio of metal of the catalyst of the formula (I) to aluminum or boron of the cocatalyst of 1:0.1 to 1:100 000.

6. The process of claim 1, wherein the copolymerizing is performed at a molar ratio of monomers to catalyst of formula (I) of $1\times10^{10}$:1 to 100:1.

7. The process of claim 1, wherein the copolymerizing is performed in a solvent selected from the group consisting of butane, hexane, heptane, toluene, xylene, and ethylbenzene.

8. The process of claim 1, wherein the copolymerizing is performed at a temperature of −30° C. to 250° C.

9. The process of claim 1, wherein the copolymerizing is performed at a pressure of 0.1 to 1 MPa.

10. The process of claim 1, wherein a molar proportion of 3-methylbut-1-ene monomer in the reaction mixture in the sum of monomers of 3-methylbut-1-ene and ethene and propene is at least 20%.

11. The process of claim 1, wherein a proportion of 3-methylbut-1-ene monomer in the reaction mixture in the sum of monomers of 3-methylbut-1-ene and ethene and propene is 40 to 80%.

12. The process of claim 1, wherein, in the catalyst of formula (I),

Cp* and Y are the same or different and are each selected from the group consisting of a cyclopentadienyl group, an indenyl group, and a fluorenyl group, Z is a hydrocarbon group, M is a metal of group 4 of the Periodic Table of the Elements, X is a halogen, and m is two.

13. The process of claim 1, wherein the catalyst of formula (I) has formula (II)

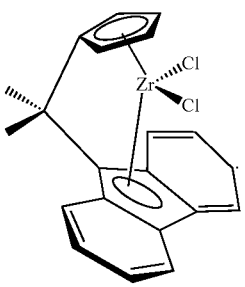

(II)

14. The process of claim 1, wherein, in the catalyst of formula (I),

Cp* is a cyclopentadienyl group substituted by 1 to 4 methyl groups,

Y is a nitrogen-comprising group,

Z is a silicon-comprising group,

M is a metal of group 4 of the Periodic Table of the Elements,

X is a halogen, and m is two.

15. The process of claim 14, wherein, in the catalyst of formula (I) has formula (IV)

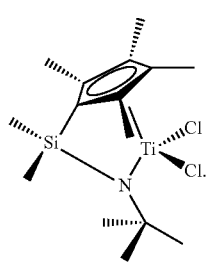

(IV)

16. The process of claim 1, wherein the 3-methylbut-1-ene is obtained by a) hydroformylating isobutene to 3-methylbutanal, b) hydrogenating the 3-methylbutanal to 3-methylbutanol, and c) eliminating water from 3-methylbutanol, wherein the 3-methylbut-1-ene obtained from the eliminating c) is added to the reaction mixture directly without performing a chemical purification.

17. The process of claim 1, wherein the copolymerizing is performed at a temperature of 50° C. to 80° C.

18. The process of claim 1, wherein the catalyst of formula (I) has formula (III)

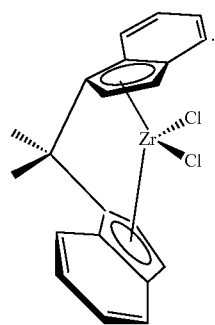

(III)

19. The process of claim 1, wherein the catalyst of formula (I) has formula (V)

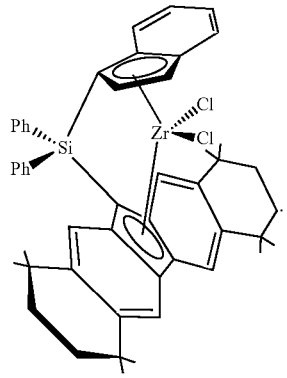

(V)

20. The process of claim 1, wherein, in the catalyst of formula (I),
Cp* and Y are the same or different and are each selected from the group consisting of a cyclopentadienyl group, an indenyl group, and a fluorenyl group,
Z is a hydrocarbon group,
M is a metal of group 4 of the Periodic Table of the Elements,
X is a chlorine, and
m is two.

* * * * *